(12) United States Patent
Ren

(10) Patent No.: US 10,978,911 B2
(45) Date of Patent: Apr. 13, 2021

(54) INDUCTIVE POWER TRANSFER SYSTEM

(71) Applicant: Apple Inc., Cupertino, CA (US)

(72) Inventor: Saining Ren, Auckland (NZ)

(73) Assignee: Apple Inc., Cupertino, CA (US)

(*) Notice: Subject to any disclaimer, the term of this patent is extended or adjusted under 35 U.S.C. 154(b) by 511 days.

(21) Appl. No.: 15/841,111

(22) Filed: Dec. 13, 2017

(65) Prior Publication Data
US 2018/0175671 A1 Jun. 21, 2018

Related U.S. Application Data

(60) Provisional application No. 62/436,086, filed on Dec. 19, 2016.

(51) Int. Cl.
*H02J 50/12* (2016.01)
*H01F 38/14* (2006.01)
(Continued)

(52) U.S. Cl.
CPC .............. *H02J 50/12* (2016.02); *H01F 27/02* (2013.01); *H01F 27/24* (2013.01); *H01F 38/14* (2013.01);
(Continued)

(58) Field of Classification Search
CPC .. H02J 50/12; H02J 50/90; H02J 50/50; H02J 7/0044; H02J 50/10; H02J 50/40;
(Continued)

(56) References Cited

U.S. PATENT DOCUMENTS 5,000,178 A 3/1991 Griffith
5,469,036 A 11/1995 Eto
(Continued)

FOREIGN PATENT DOCUMENTS

AU 2014262220 B2 12/2015
CN 101461114 6/2009
(Continued)

OTHER PUBLICATIONS

Budhia, et al., "Develpoment of a Single-Sided Flux Magnetic Coupler for Electric Vehicle IPT Charging Systems", IEEE Transactions on Industrial Electronics, vol. 60, No. 1, Jan. 1, 2013 (Jan. 1, 2013), pp. 318-328, XP002781664, DOI: 10.1109/TIE.2011.2179274, p. 325.

Bosshard et al., "Comprehensive Evaluation of Rectangular and Double-D Coil Geometry for 50 kw/85 kHz IPT-System" IEEE Journal of Emerging and Selected Topics on Power Electronics (JESTPS), vol. 4, No. 4, Dec. 31, 2016 (Dec. 31, 2016), pp. 1406-1415, XP002781665, DOIL 10-1109/JESTPE.2016.2600162, p. 1408.

(Continued)

*Primary Examiner* — Jared Fureman
*Assistant Examiner* — Michael J Warmflash
(74) *Attorney, Agent, or Firm* — Blank Rome LLP

(57) ABSTRACT

An inductive power transfer (IPT) system may include an inductive power transmitter having at least one power transmitting coil that generates an IPT field and an IPT director unit over the inductive power transmitter. The IPT director unit may include a low reluctance element such as a magnetic core configured to direct the IPT field from the inductive power transmitter to an inductive power receiver held in place over the IPT director unit (e.g., by a housing of the IPT director unit). While the IPT director unit directs the IPT field from the inductive power transmitter to the inductive power receiver, a mean direction and density of the IPT field entering the low reluctance element from the inductive power transmitter may be different from the mean direction and density of the IPT field exiting the low reluctance element towards the inductive power receiver.

18 Claims, 11 Drawing Sheets

(51) Int. Cl.
*H01F 27/02* (2006.01)
*H01F 27/24* (2006.01)
*H02J 50/90* (2016.01)
*H02J 50/50* (2016.01)
*H02J 7/00* (2006.01)
*H02J 50/10* (2016.01)
*H02J 7/02* (2016.01)
*H02J 50/40* (2016.01)

(52) U.S. Cl.
CPC ............ *H02J 7/0044* (2013.01); *H02J 50/10* (2016.02); *H02J 50/50* (2016.02); *H02J 50/90* (2016.02); *H02J 7/025* (2013.01); *H02J 50/40* (2016.02)

(58) Field of Classification Search
CPC .......... H02J 7/025; H01F 38/14; H01F 27/02; H01F 27/24
See application file for complete search history.

(56) References Cited

U.S. PATENT DOCUMENTS

| | | | |
|---|---|---|---|
| 5,496,036 | A | 3/1996 | Chester |
| 6,151,231 | A | 11/2000 | Saint-Pierre et al. |
| 6,320,772 | B1 | 11/2001 | Doyama et al. |
| 8,692,639 | B2 | 4/2014 | Baarman et al. |
| 9,190,866 | B2 | 11/2015 | Cheikh et al. |
| 9,236,174 | B2 | 1/2016 | Lee |
| 2005/0068019 | A1 | 3/2005 | Nakamura et al. |
| 2005/0133497 | A1 | 6/2005 | Makoto |
| 2007/0064406 | A1 | 3/2007 | Beart |
| 2010/0109604 | A1 | 5/2010 | Boys et al. |
| 2010/0259217 | A1 | 10/2010 | Baarman et al. |
| 2013/0026850 | A1 | 1/2013 | Throngnumchai et al. |
| 2013/0030892 | A1 | 1/2013 | Liu et al. |
| 2013/0063084 | A1* | 3/2013 | Tilvis .................. H01F 27/28 320/108 |
| 2013/0119773 | A1 | 5/2013 | Davis |
| 2014/0091755 | A1 | 4/2014 | Walley et al. |
| 2014/0177197 | A1 | 6/2014 | Lampinen |
| 2014/0197687 | A1 | 7/2014 | Lin |
| 2014/0339904 | A1* | 11/2014 | Kari .................... H02J 50/40 307/104 |
| 2015/0207337 | A1 | 7/2015 | Peterson et al. |
| 2016/0197511 | A1* | 7/2016 | Atasoy ................. H02J 50/10 307/104 |
| 2017/0008406 | A1* | 1/2017 | Takatsu ................ H02J 50/12 |
| 2018/0034327 | A1* | 2/2018 | Ren ..................... H02J 50/12 |

FOREIGN PATENT DOCUMENTS

| | | |
|---|---|---|
| DE | 19932504 A1 | 2/2001 |
| EP | 1041589 B1 | 1/2008 |
| JP | H06277358 | 10/1994 |
| JP | 2846090 B2 | 1/1999 |
| JP | 2001044054 | 2/2001 |
| JP | 2002246248 | 8/2002 |
| JP | 2006042519 | 2/2006 |
| JP | 2006128381 | 5/2006 |
| JP | 2007505480 | 3/2007 |
| JP | 2011229360 | 11/2011 |
| JP | 2011229360 A | 11/2011 |
| JP | 04955691 B2 | 6/2012 |
| JP | 2013534040 A | 8/2013 |
| JP | 2015133904 A | 7/2015 |
| KR | 100944113 | 2/2010 |
| KR | 1020100017582 | 2/2010 |
| KR | 1509929 B1 | 4/2015 |
| WO | 2003105308 | 12/2003 |
| WO | 2005024865 | 3/2005 |
| WO | 2005033819 A2 | 4/2005 |
| WO | 200712632 | 11/2007 |
| WO | 2008137996 A1 | 11/2008 |
| WO | 2008140333 | 11/2008 |
| WO | 2009004587 A2 | 4/2009 |
| WO | 2010090539 | 8/2010 |
| WO | 2011016736 | 2/2011 |
| WO | 2011016737 | 2/2011 |
| WO | 2011016737 A1 | 2/2011 |
| WO | 2012019663 A1 | 2/2012 |
| WO | 2013025776 A1 | 2/2013 |
| WO | 2013036146 A1 | 3/2013 |
| WO | 2013122483 A1 | 8/2013 |
| WO | 2014011059 A1 | 1/2014 |
| WO | 2014083015 A1 | 6/2014 |
| WO | WO-2015147093 A1 * | 10/2015 ............. H02J 7/025 |
| WO | 2014179320 A1 | 11/2016 |

OTHER PUBLICATIONS

Boys, John T., et al., "Controlling Inrush Currents in Inductively Coupled Power Systems", 2005 International Power Engineering Conference, Nov. 29, 2005-Dec. 2, 2005, 7, IEEE, Singapore, Singapore.

* cited by examiner

INDUCTIVE POWER TRANSFER SYSTEM

This patent application claims the benefit of provisional patent application No. 62/436,086, filed on Dec. 19, 2016, which is hereby incorporated by reference herein in its entirety.

FIELD

The present invention is in the field of inductive or wireless power transfer. More particularly, but not exclusively, the present invention is directed to systems for improving inductive power transfer.

BACKGROUND

Inductive power transfer (IPT) technology is an area of increasing development and IPT systems are now utilised in a range of applications and with various configurations. One such application is the use of IPT systems in wireless power transmitting devices such as so-called 'charging mats' or 'charging pads'. Such charging mats will normally provide a planar charging surface onto which portable electronic devices (such as smartphones) may be placed to be charged or powered wirelessly. Such portable electronic devices typically have a planar exterior surface and are charged when the planar exterior surface is placed onto and parallel with the planar charging surface of the charging mat. However, in practice, it can be difficult to ensure satisfactory wireless charging efficiency for portable electronic devices that are placed onto the charging mat at different orientations or that have non-planar exterior surfaces.

It may therefore be desirable to provide improved wireless power transmitting devices for wirelessly charging or powering portable electronic devices.

SUMMARY

According to one exemplary embodiment there is provided an inductive power transfer system comprising: an inductive power transmitter having at least one power transmitting coil configured to generate an inductive power transfer (IPT) field; and an IPT director unit moveable with respect to the inductive power transmitter, the IPT director unit comprising a low reluctance element configured to direct the IPT field from the inductive power transmitter to an inductive power receiver having at least one power receiving coil such that the mean direction of the IPT field going into the low reluctance element is substantially different to the mean direction of the IPT field coming out of the low reluctance element.

According to a further embodiment there is provided an inductive power transfer system comprising: an inductive power transmitter having at least one power transmitting coil configured to generate an inductive power transfer (IPT) field; an inductive power receiver having at least one power receiving coil configured to be in a predetermined special relationship to the inductive power transmitter; and an IPT director unit located between the inductive power transmitter and the inductive power receiver comprising a low reluctance element configured to direct the IPT field from the inductive power transmitter to the inductive power receiver, wherein the IPT director unit is rotatable with respect to at least one of the inductive power transmitter and the inductive power receiver.

DETAILED DESCRIPTION

Figure 1:
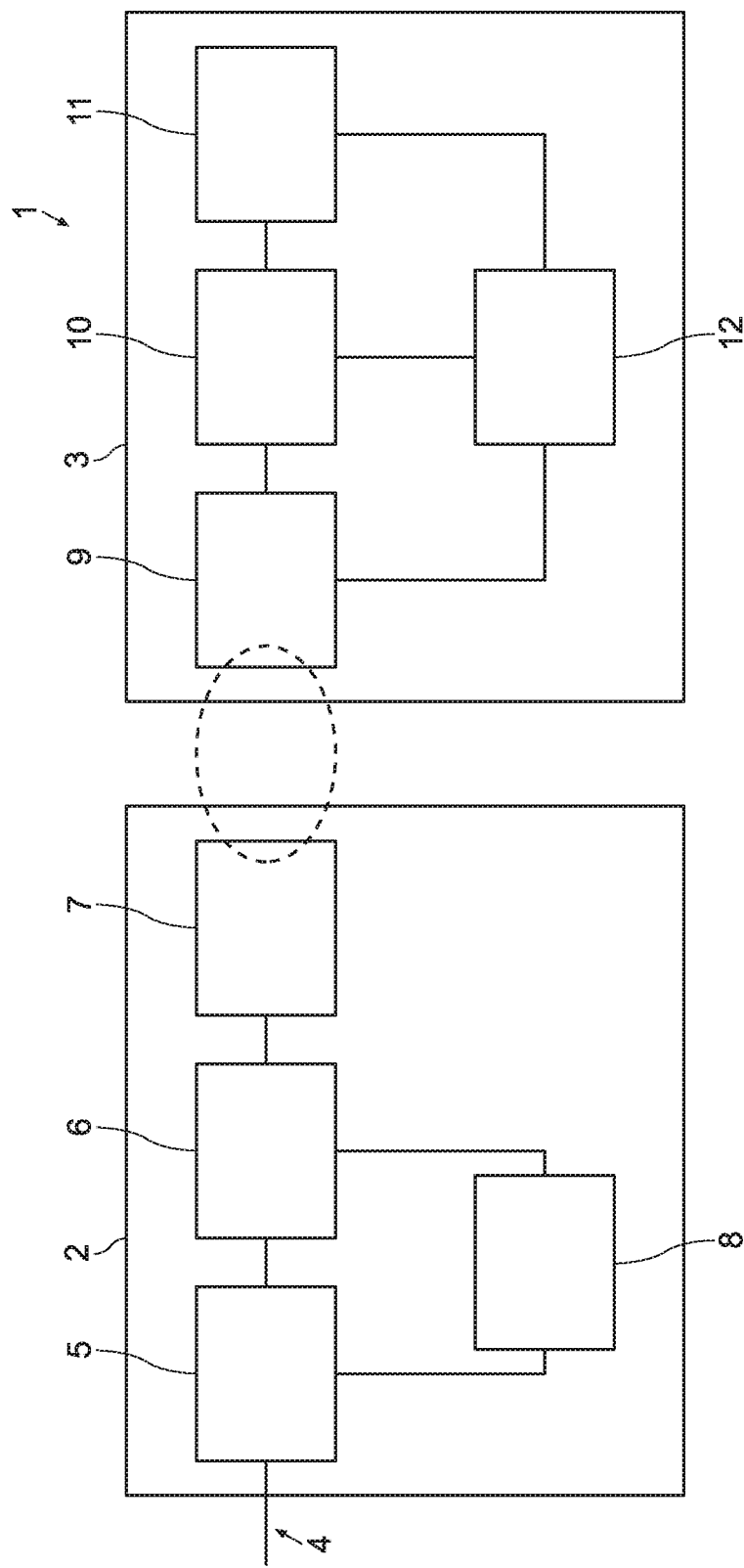
FIG. 1 is a block diagram of an inductive power transfer system in accordance with an embodiment.

Wireless power transmitting devices that operate using inductive power transfer (IPT) technology such as wireless charging mats or charging pads may include a transmitter having one or more power transmitting coils arranged parallel to the planar charging surface of the charging mat. The transmitter may drive the transmitting coil(s) so that the transmitting coil(s) generate a time-varying magnetic field in the immediate vicinity of the planar charging surface. When portable electronic devices are placed on or near the planar charging surface, the time-varying magnetic field may induce an alternating current in the receiving coil(s) of a suitable receiver associated with the device (for example a receiver incorporated into the device itself). The received power may then be used to charge a battery on the device or to power the device or some other load.

A problem associated with charging mat design is ensuring that inductive power transfer efficiency between the charging mat and the device is satisfactory for different orientations of receiving coil(s) with respect to the transmitting coil(s). For planar or flat devices, such as smartphones, the device will often simply be placed flat onto the charging surface and therefore the receiving coil(s) associated with the device (which are typically coplanar with the plane of the device) will be in a plane parallel to the transmitting coil(s). As a result of the coplanar relationship between the transmitting coil(s) and receiving coil(s) coupling is maximised and power transfer efficiency is satisfactory. However, for non-planar or arbitrarily shaped devices, such as wearable electronic devices, the receiving coil(s) associated with the device are more likely to be at an arbitrary angle or orientation relative to the transmitting coil(s) because the device itself may not sit flat on the charging surface. This situation may also occur for planar devices if a user wishes to orient the device for ease of use during charging/powering, e.g., the user may prop the device at an angle to the charging surface so that a screen of the device can be interacted with. Thus, without requiring device designers to provide 'flat' exterior surfaces for coupling with the receiving coil(s) or without forcing users not to deviate from a co-planar orientation of their device with respect to the charging surface, if care is not taken, the inductive power transfer efficiency may be significantly diminished, thereby limiting the applicable uses of charging mats.

Another problem associated with charging mat design is enabling multiple devices to be charged or powered simultaneously in an efficient and cost effective manner. Some designs use a single large transmitting coil corresponding to the entire charging surface of the charging mat. In this instance, one or more devices may be placed anywhere on the charging surface of the charging mat. This allows more freedom in terms of where a user may place a device on the charging mat. However, the magnetic field produced by a large transmitting coil may not be uniform, with 'weak spots' towards the centre of the charging surface, and the problems with arbitrary receiving coil orientation are not ameliorated. Further, since the entire charging surface is being 'powered' it is possible that any portions of the charging surface not covered by a device being charged may present a safety hazard.

The charging mat may include an array of transmitting coils for charging multiple devices. In order to provide efficient and safe power transfer, the charging mat may detect the position of the devices using a suitable detection mechanism and may activate the most proximate transmitting coil or coils. Though this allows more freedom as to where a user may place a device, like the single coil design, the boundary between adjacent transmitting coils can result in weak spots due to the cancelling effects of adjacent coils whereby receivers do not receiver sufficient power, and the problems with arbitrary receiving coil orientation are not ameliorated.

Another use of IPT systems is in pieces of equipment where power needs to be transferred from a power source to a load between two moving parts. One such example is a microscope where it may be necessary to transfer power down the microscope's body tube to provide power to a light adjacent to the objective lens. The body tube may comprise two parts, where one rotates with respect to the other (e.g., for the provision of a focussing mechanism) inhibiting the use of a traditional wired connection. In another example, the piece of equipment may include an articulated arm (such as might be used in robotics) where it may be necessary to transfer power from a power source at one end of the arm to an accessory at the other end. It may not always be possible or desirable to have a wired connection (e.g., if the articulated arm needs complete freedom of movement). An IPT system may be used to transfer power across the junction between the two moving parts by providing a source transmitter in one part and a load receiver in the other part. The source transmitting coil and load receiving coil may be positioned so that there is a good coupling between the source transmitter and the load receiver irrespective of the relative positions of the parts.

In more complicated pieces of equipment, there may be a series of more than two parts and therefore more than one junction (e.g., there may be a fixed part, an intermediary part, and a terminal part, with each part able to move with respect to the other). Following on from the above example, the body tube of a microscope may be split into three parts to provide for two focussing mechanisms (e.g., a coarse focus and a fine focus). The articulated arm may have two junctions to give more degrees of movement. As will be appreciated, this makes it more difficult to transfer power directly from the source transmitter (i.e. the transmitter located in the fixed part) to the load receiver (i.e. the receiver located in the terminal part) due to factors such as increased distance or increased variability of the relative orientation of the transmitting and receiving coils.

One approach to transferring power across such junctions is to use a repeater located in the intermediary part. In its most simple form, a repeater consists of a repeater receiver coil connected to a repeater transmitter coil. The repeater receiver coil inductively receives power from the source transmitter located in the fixed part, which power is then supplied to the repeater transmitter coil. The repeater transmitter coil then inductively transfers power to the load receiver located in the terminal part. It will thus be appreciated that power is transferred from the fixed part to the terminal part via the intermediary part across two junctions. A problem associated with this approach is that repeaters, being circuitry, introduce additional cost and complexity. Further, for applications on a small scale, repeaters become even more costly and complex.

An inductive power transfer (IPT) system 1 is shown generally in FIG. 1. The IPT system includes an inductive power transmitter 2 and an inductive power receiver 3. The inductive power transmitter 2 may be coupled to an appropriate power supply 4 (such as mains power or a battery). The inductive power transmitter 2 may include transmitter circuitry having one or more of a converter 5, e.g., an AC-DC converter (depending on the type of power supply used), and an inverter 6, e.g., coupled to the converter 5 (if present). The inverter 6 may supply a transmitting coil or coils 7 with an AC signal so that the transmitting coil or coils 7 generate a time-varying magnetic field. Such a field will hereafter be referred to as the IPT field. In some configurations, the transmitting coil or coils 7 may be integral to the inverter, however in the embodiment shown in FIG. 1 they are shown as separate from the inverter 6. The transmitting coil or coils 7 may also be connected to capacitors (not shown) either in parallel or series to create a resonant circuit.

A controller 8 is provided to control operation of the inductive power transmitter 2 and may be directly or indirectly connected to several or all parts of the inductive power transmitter 2. The controller 8 may receive inputs from the various operational components of the inductive power transmitter 2 and may produce outputs that control the operation of the inductive power transmitter. The controller 8 may be implemented as a single unit or separate units, configured to control various aspects of the inductive power transmitter 2 depending on its capabilities, including, for example: power flow, tuning, selectively energising transmitting coil or coils 7, inductive power receiver detection and/or communications.

The inductive power receiver 3 may include a power pick-up stage 9 connected to power conditioning circuitry 10 that in turn supplies power to a load 11. The load may be an electrically operational part of an electronic device or machine, or may be one or more power storage elements. The power pick-up stage 9 includes an inductive power receiving coil or coils. When the coil(s) of the inductive power transmitter 2 and the inductive power receiver 3 are suitably coupled, the IPT field generated by the transmitting coil or coils 7 induces an alternating current in the receiving coil or coils. The receiving coil or coils may be connected to capacitors and additional inductors (not shown) either in parallel, series or some other combination, such as inductor-capacitor-inductor, to create a resonant circuit. In some inductive power receivers, the inductive power receiver may include a controller 12 which may control tuning of the receiving coil or coils, operation of the power conditioning circuitry 10, characteristics of the load 11 and/or communications.

Current induced in the power pick-up stage 9 by transmitting coil or coils 7 will typically be high frequency AC at the frequency of operation of the transmitting coil or coils 7, which may be for example, 20 kHz, up to hundreds of megahertz or higher. The power conditioning circuitry 10 may be configured to convert the induced current into a form that is appropriate for powering or charging the load 11, and may perform for example power rectification, power regulation, or a combination of both.

Coils 7 may include electrically conductive structures that are provided with an electrical current to generate a magnetic field. For example inductive coils may be electrically conductive wires in three dimensional shapes or two dimensional planar shapes, electrically conductive material fabricated using printed circuit board (PCB) techniques into three dimensional shapes over plural PCB 'layers', or may have other coil-like shapes. Other configurations may be used depending on the application.

Figure 2:
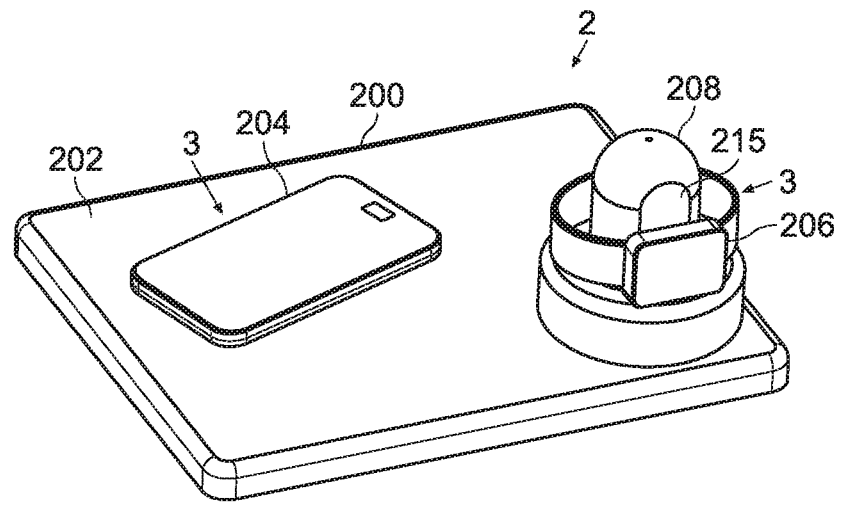
FIG. 2 illustrates an example application of the inductive power transfer system with an IPT director unit in accordance with an embodiment.
Figure 3:
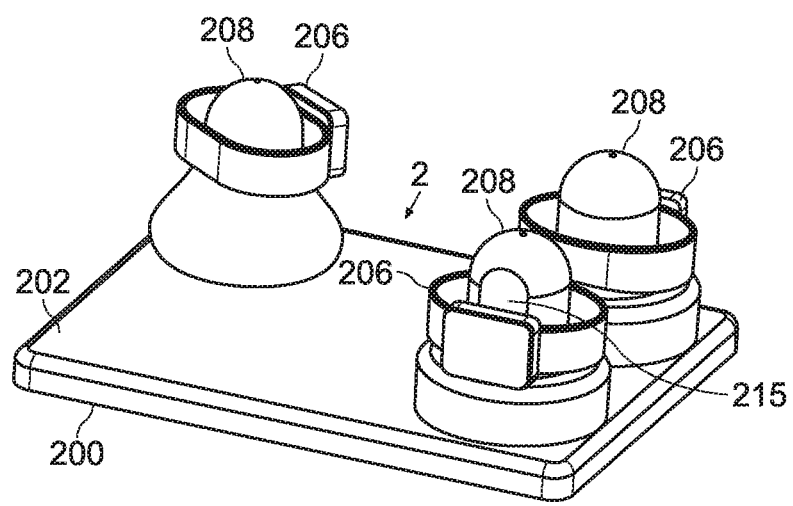
FIG. 3 illustrates another example application of the inductive power transfer system with example configurations of the IPT director unit in accordance with an embodiment.

FIGS. 2 and 3 illustrate depictions of example applications of an IPT system such as system 1 of FIG. 1. In these examples, inductive power transmitter 2 is implemented as a charging mat or charging pad 200 having one or more transmitting coils (not shown in FIGS. 2 and 3 for the sake of clarity). The transmitting coils in charging mat 200 may be arranged in a plane parallel to a charging surface 202 of charging mat 200 onto which one or more electronic devices such as devices 204 and 206 can be placed. While the inductive power transmitter is depicted in this description as a device (e.g. a charging mat), other configurations may be used, such as an inductive power transmitter integrated into the surfaces of non-device objects, e.g., bench tops or desktops of furniture, and the interiors of motor vehicles. In another suitable arrangement, the inductive power transmitter may be integrated within other types of charging devices, for example, a charging box.

In the example of FIG. 2, two electronic devices 204 and 206 are shown as being powered/charged by charging mat 200. For example, electronic device 204 may be a substantially planar electronic device having a planar exterior surface such as a smartphone. Inductive power receiver 3 of FIG. 1 may be integrated within electronic device 204 or connected in some other way to electronic device 204, e.g., via an "after-market" cover or device. The receiving coil(s) (not shown in FIGS. 2 and 3 for the sake of clarity) of device 204 are generally positioned so that they are in a plane parallel with the transmitting coil(s) of the inductive power transmitter in the orientation depicted in FIG. 2. In the example of FIG. 2, electronic device 206 is a wearable electronic device (e.g., a smartwatch), which has the inductive power receiver 3 of FIG. 1 integrated therewith. Unlike electronic device 204, electronic device 206 is positioned on charging mat 200 so that its receiving coil(s) may not be in a plane parallel with the transmitting coil(s) of the inductive power transmitter when device 206 is placed directly onto the charging surface 202.

In order to ensure maximum power transfer efficiency to the electronic device 206, an IPT director such as IPT director unit 208 may be provided. IPT director unit 208 may function to direct the IPT field of the inductive power transmitter for receipt by the inductive power receiver of electronic device 206. IPT director unit 208 may be moveable with respect to the charging mat 200 (and therefore the inductive power transmitter 2 therein), enabling a user to position the IPT director unit as required. The IPT director unit 206 may be temporarily secured to the charging surface 202 if desired. For example, IPT director unit 206 may be secured using an adhesive or an arrangement of magnets. In FIG. 2, IPT director unit 208 is depicted as a 'stand' for the wearable electronic device 206. FIG. 3 depicts multiple examples of possible configurations of stand 208 holding or supporting the wearable electronic device 206. The actual configuration, e.g., the exterior shape, dimensions and aspect of IPT director unit 208, is not limited to this however, and may depend on the type of electronic device and inductive power receiver to which power transfer is to be directed.

Figure 4A:
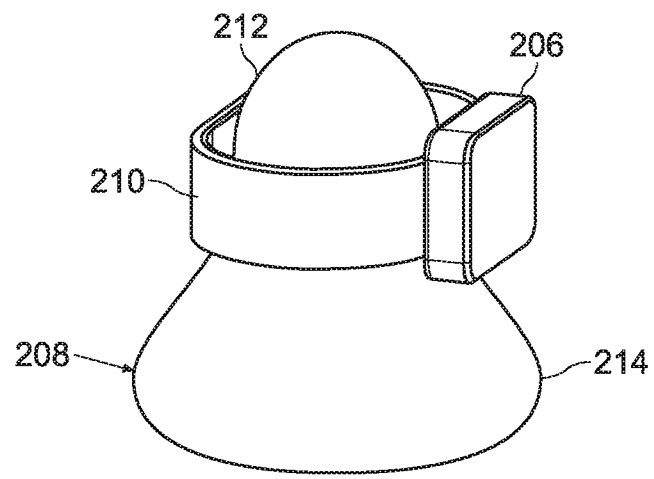
FIGS. 4A and 4B are isolated views of one example configuration of the IPT director unit in accordance with an embodiment.
Figure 4B:
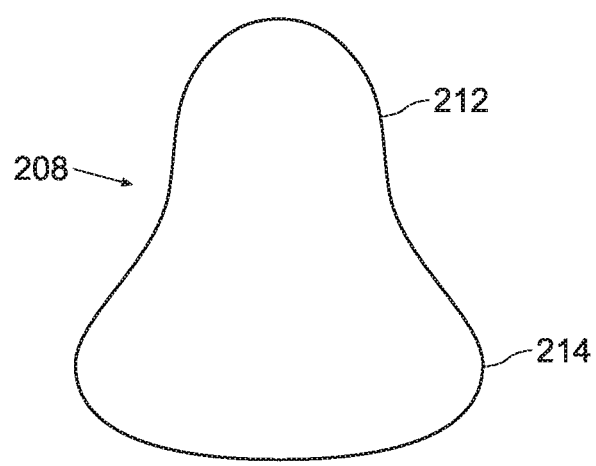

FIGS. 4A and 4B illustrate one example of IPT director units 208 for supporting wearable electronic device 206. As shown in FIGS. 4A and 4B, IPT director unit 208 may have a curved shape that is configured so that a strap 210 of wearable electronic device 206 is received over a neck portion 212 of IPT director unit 208 so as to be supported against a body portion 214. The IPT director unit 208 may include a low reluctance (or high magnetic permeability) element (not shown in FIGS. 4A and 4B) configured to direct the IPT field from the inductive power transmitter of charging mat 200 (FIGS. 2 and 3) to the inductive power receiver associated with the wearable electronic device 206.

Figure 5:
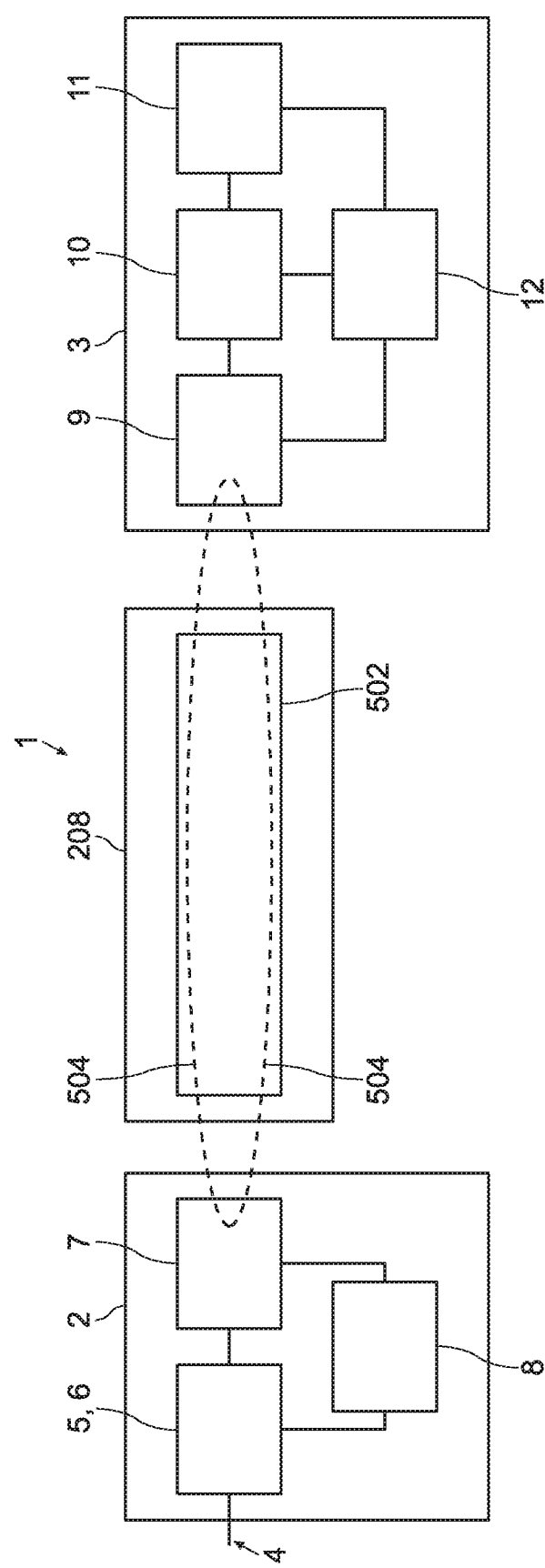
FIG. 5 is a block diagram of an inductive power transfer system having the IPT director unit in accordance with an embodiment.

A block diagram representing IPT director unit 208 relative to the block diagram of the inductive power transmitter 2 and inductive power receiver 3 depicted and described in relation to FIG. 1 is shown in FIG. 5. As shown in FIG. 5, IPT director unit 208 may include a low reluctance element 502. The low reluctance element may be made of any material having a relatively high magnetic permeability. In one embodiment, the material may have a relative magnetic permeability greater than 10. In a more specific embodiment, the material may have a relative magnetic permeability greater than 100. For example, the low reluctance element may be made of ferrite. As represented by dashed lines 504 in FIG. 5, low reluctance element 502 provides a path of low reluctance such that the IPT field is able to extend between the transmitting coil(s) 7 of the inductive power transmitter 2 and the power pick-up stage 9 of the inductive power receiver 3. In other words, the IPT director unit 'directs' the IPT field from the inductive power transmitter 2 to the inductive power receiver 3. In this way, inductive power receiver 3 is able to receive power inductively from the inductive power transmitter 2 despite an increased distance between the inductive power transmitter (relative to device 204 of FIGS. 2 and 3). If desired, by changing the geometry of the low reluctance element, the IPT director unit can be used to direct the IPT field across increased distances and in non-linear directions.

Figure 6A:
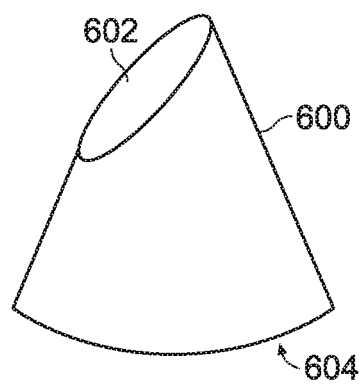
FIG. 6A is an isolated view of one example of the low reluctance element in accordance with an embodiment.

FIG. 6A shows an example low reluctance element 600 that may be located inside the IPT director units 208 depicted and described with respect to FIGS. 2 to 5. In this example, low reluctance element 600 is a block made of a material of high magnetic permeability, e.g., ferrite, and formed in substantially the shape of a truncated cone. The cone has been truncated such that the truncated surface 602 is not parallel to the base 604. The geometry of the low reluctance element 600 may impact the shape of the IPT field.

Figure 6B:
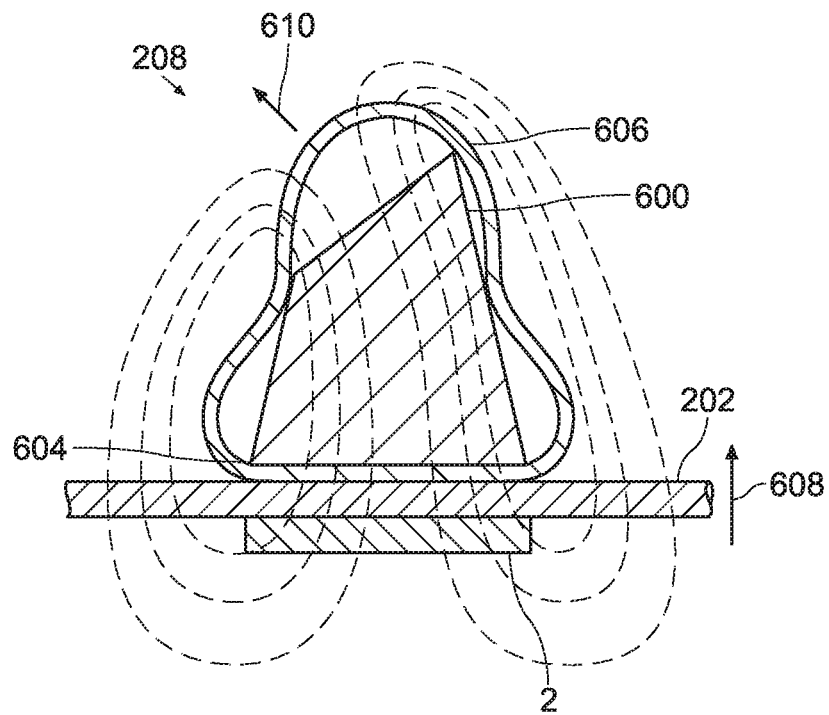
FIG. 6B is a cross-sectional view of an inductive power transfer system, including the low reluctance element of FIG. 6A in accordance with an embodiment.

FIG. 6B shows a vertical cross-section through the IPT director unit 208 shown in FIG. 4B including the low reluctance element 600 shown in FIG. 6A. As shown in FIG. 6B, the IPT director unit is located adjacent to (e.g., on or over and in contact with) a charging surface 202 above an inductive power transmitter 2. The IPT director unit 208 includes a housing 606 that encases low reluctance element 600. The housing may be formed of a mouldable material. The form of housing 606 may, for example, be configured to restrict the movement of low reluctance element inside housing 606.

When power is supplied to inductive power transmitter 2 an IPT field is generated. The field lines of the generated IPT field are shown as dashed lines in FIG. 6B. It will be appreciated that, in fact, an IPT field extends infinitely, therefore the field lines in FIG. 6B represent, for illustrative purposes, the part of the IPT field that may be used for power transfer. As shown in FIG. 6B, the field lines enter low reluctance element 600 through base 604. At this stage, essentially all the field lines are vertical (i.e. perpendicular to the plane of the charging surface 202).

Therefore, the mean direction of the IPT field going into (entering) the low reluctance element is vertical (e.g., entering the low reluctance element through a primary entry surface of the low reluctance element such as the surface of the low reluctance element on surface 202 of transmitter 200). This direction is shown on FIG. 6B by arrow 608. Due to the asymmetry of low reluctance element 600 and since the IPT field will tend to follow a path of least reluctance, the IPT field is skewed as it passes through and comes out of the low reluctance element 600. This change in the IPT field is illustrated in FIG. 6B. For example, as shown in FIG. 6B, the field lines are skewed in the direction of truncated surface 602 of low reluctance element 600. Therefore, the mean direction of the IPT field coming out of (emerging or exiting from) the low reluctance element is substantially at a non-zero angle to vertical (e.g., exiting the low reluctance element through a primary exit surface of the low reluctance element such as a surface of the low reluctance element opposite to surface 202 of transmitter 200). This direction is shown on FIG. 6B by arrow 610. A comparison of arrow 608 with arrow 610 illustrates that the low reluctance element is able to direct the IPT field such that the mean direction of the IPT field going into the element is substantially different to the mean direction of the IPT field coming out of the element. Thus, if a wearable electronic device 206 is placed onto the IPT director unit 208 (for example, as is shown in FIGS. 2 to 4A) it can be ensured that more flux will be captured by the inductive power receiver 3 located in the body of the wearable electronic device thereby improving power transfer (relative to scenarios where wearable electronic device 206 is placed onto surface 202 without IPT director unit 208).

In the example depicted in FIG. 6B, it may be necessary for the wearable electronic device 206 to be positioned so that its receiving coil(s) are properly aligned with the low reluctance element to maximise power transfer. One possible approach to ensure optimal positioning may be to provide a suitable marking on the IPT director unit to designate the correct orientation, as an example. Alternatively, neck portion 212 of IPT director unit 208 can be configured to allow inherent alignment (e.g., neck portion 212 may be shaped so that wearable electronic device 206 will be properly aligned and oriented when placed correctly onto IPT director unit 208). This is depicted in FIG. 2 by a 'flat' facet 215 onto which a 'flat' surface of the wearable device 206 will be aligned.

Returning to FIG. 6B, another effect of low reluctance element 600 is the concentration of the IPT field. The field lines enter low reluctance element 600 with a first mean concentration (as represented visually by the spacing between the dashed lines). The field lines come out of the low reluctance element with a second mean concentration, higher than the first mean concentration. This increase in concentration is a consequence of the narrowing aspect of the geometry of low reluctance element 600. This increase in concentration has the benefit of increasing the flux captured by the receiving coil(s) of inductive power receiver 3 of wearable electronic device 206, thereby further increasing power transfer efficiency.

As has been shown by the discussion of FIG. 6B, the low reluctance element in the IPT director unit is able to direct the IPT field by both changing the mean direction of the field and changing the mean concentration of the field. Those skilled in the art will appreciate that the degree to which the low reluctance element directs the IPT field is a combination of the geometry of the low reluctance element, the strength of the IPT field, and the relative sizes of the transmitting coil(s) and receiving coil(s) with respect to the low reluctance element. Such factors will need to be varied to suit the intended application of the IPT director unit.

Low reluctance element 600 may sometimes be referred to herein as magnetic element 600 (e.g., a magnetic element having a relative permeability greater than 10 such as a ferrite element). Magnetic element 600 may serve as a magnetic core (e.g., a ferrite core) for IPT director unit 208 that extends from the side of IPT director unit 208 placed onto surface 202 towards the side of IPT director unit 208 that receives inductive power receiver 3 for charging (e.g., from one side of housing 606 towards an opposing side of housing 606). This magnetic core (e.g., magnetic element 600) may serve to direct the IPT field from the inductive power transmitter towards the inductive power receiver in such a way (e.g., as a function of its geometry) so that the IPT field that enters the magnetic core has a first mean direction and density that is different from a second mean direction and density of the IPT field that exits the magnetic core towards the inductive power receiver. When configured in this way, the magnetic core formed from conductive element 600 may direct the IPT field towards the inductive power receiver without the need to form additional wireless power redirecting coils within IPT director unit 208 (e.g., an additional power receiving coil within IPT director unit 208 that receives wireless power from the inductive power transmitting device and an additional power transmitting coil within IPT director unit 208 that transmits power to the inductive power receiving device) as well as any associated circuitry formed between the wireless power redirecting coils. This may serve to greatly reduce the complexity and manufacturing cost of system 1 while also increasing the wireless power transfer efficiency of IPT system 1 relative to systems that direct power between inductive power transmitting and receiving devices through an IPT director unit that includes additional redirecting coils and intervening circuitry, for example.

Figure 7A:
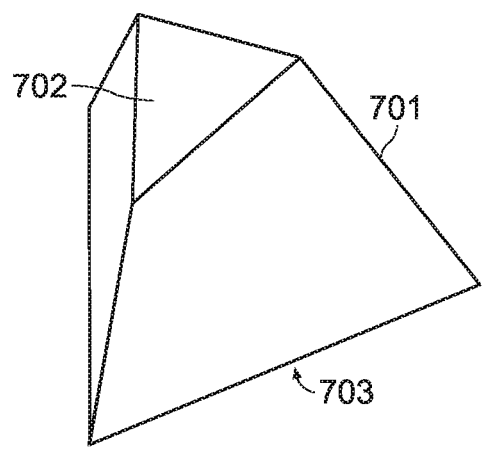
FIGS. 7A-7C are isolated views of example low reluctance elements in accordance with an embodiment.
Figure 7B:
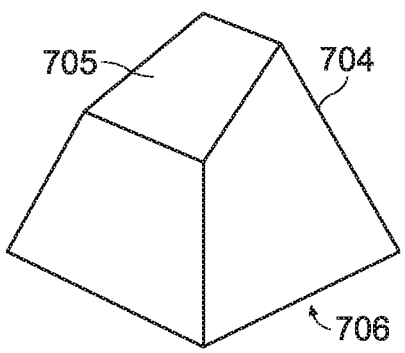
Figure 7C:
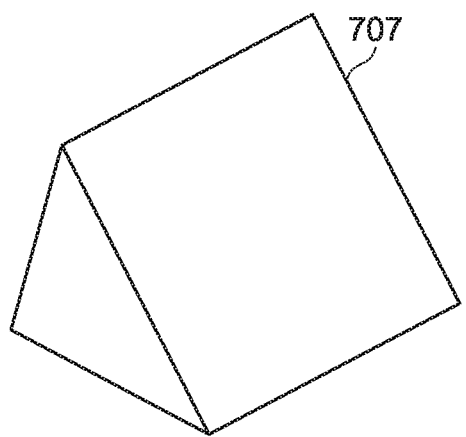

FIGS. 7A to 7C show a number of exemplary body geometries for the low reluctance element. As illustrated by the figures each geometry includes a degree of asymmetry to enable the redirection of the IPT field in accordance with the description above. Possible geometries may include: a truncated right regular triangular pyramid 701, where the truncated surface 702 is not parallel to the base 703 (FIG. 7A); a truncated right square pyramid 704, where the truncated surface 705 is not parallel to the base 706 (FIG. 7B); and a non-equilateral triangular prism 707 (FIG. 7C), as examples. The examples shown in FIGS. 7A to 7C are relatively simple in form, and it will be appreciated that these can be modified as suits the intended application. For example, the pyramidal shapes may be non-right, non-regular or have a different shaped base. While simple forms have the benefit of simpler manufacture, it will be appreciated that increasingly complex forms may be used for the low reluctance element to meet the needs of the intended application. One possible approach is to connect several simple sub-elements to create a more complex whole.

Figure 8A:
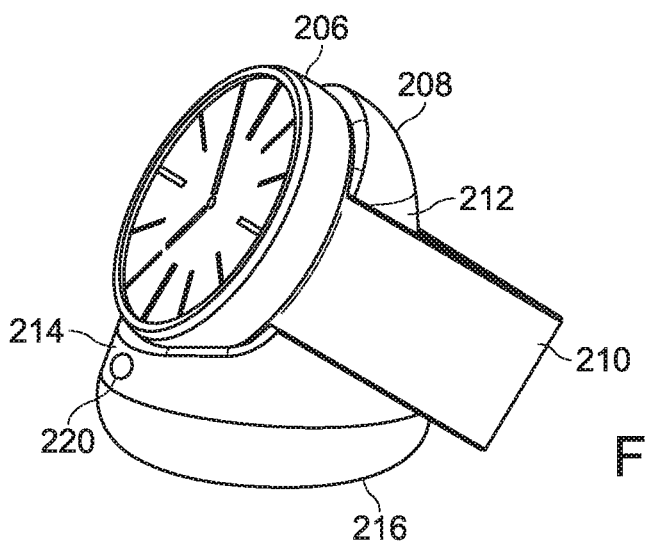
FIGS. 8A-8C are isolated views of another example configuration of the IPT director unit in accordance with an embodiment.
Figure 8B:
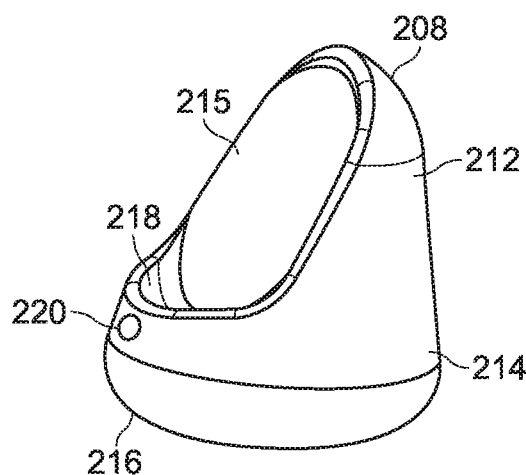
Figure 8C:
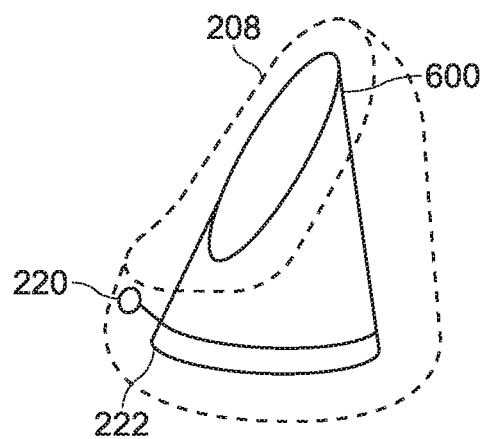

FIGS. 8A to 8C illustrate another example configuration of the IPT director unit 208 for providing ease for a user in correctly positioning the wearable device 206. In this example configuration, as illustrated in FIG. 8B, flat facet 215 is provided at an angle to base 216 of IPT director unit 208 and body portion 214 has a seat portion 218 configured to receive a watch segment of wearable electronic device 206 (e.g., a smartwatch) having receiving coil(s) therein. This arrangement may ensure that a user positions the smartwatch for maximum power transfer efficiency. This arrangement also may provide that the smartwatch is angled relative to the charging mat. Others devices can be supported in this relationship, such as smartphones, such that users are able to interact with the device during powering/charging. FIG. 8C shows low reluctance element 600 located inside IPT director unit 208 of FIGS. 8A and 8B. As with the example discussed in relation to FIGS. 6A and 6B, the low reluctance element is a truncated cone in FIG. 8C.

The IPT director unit 208 shown in FIGS. 8A to 8C may include an electronic indicator 220. In this case, the electronic indicator is an LED, but any combination of audio or visual indicators may be suitable. The electronic indicator 220 is connected to an indicator receiver coil 222 such that when an IPT field is being supplied to the IPT director unit, the electronic indicator indicates that the IPT director unit is ready for use or is activated. For example, the LED may be illuminated to indicate active charging. The size of the indicator receiver coil 222 and the location of the indicator receiver coil 222 will be such as to ensure enough power is received to power the electronic indicator, while minimising the impact on the power transfer from the inductive power transmitter to the inductive power receiver of electronic device 206. If the power needs of the electronic indicator are low (as for example is the case with an LED), then the receiving coil can be relatively small. The electronic indicator 220 may be connected to further control circuitry (not shown) so that the electronic indicator can be controlled to convey various information about the IPT field. By way of example only: the LED may be off, when there is no power being supplied to the IPT director unit; the LED may be on when there is power being supplied to the IPT director unit; and the LED may flash to indicate a fault.

Figure 9A:
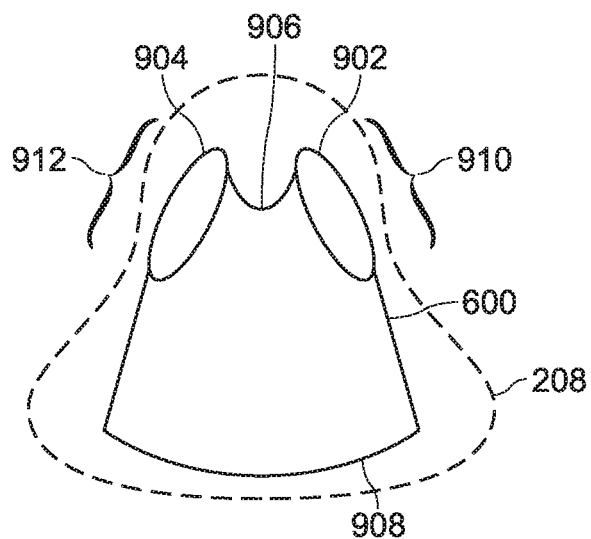
FIGS. 9A and 9B are conceptual views of example configurations of the low reluctance element of the IPT director unit in accordance with an embodiment.
Figure 9B:
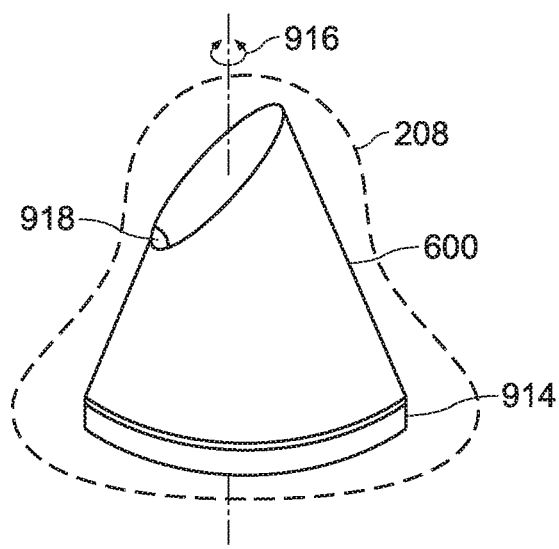

Ease for a user can be further improved by configuring low reluctance element 600 of IPT director unit 208 so that multiple power receiving zones are provided. To this end, FIGS. 9A and 9B depict example low reluctance elements that result in more than one operative power receiving zone. In both figures IPT director unit 208 has been shown in dashed lines so that the low reluctance element can be shown. As shown in FIG. 9A, the low reluctance element is a variation of a truncated cone, having two truncated surfaces 902 and 904 with a saddle 906 between each surface. As with the truncated cone discussed in relation to FIGS. 6A and 6B, each truncated surface is not parallel with the base 908. For the same reasoning as previously discussed, the mean direction of the IPT field going into low reluctance element 600 (i.e. through base 908) will be essentially vertical, whereas the mean direction of the IPT field coming out of the low reluctance element (through each surface 902 and 904) will be more horizontal. By providing two truncated surfaces, there are two resulting zones 910 and 912 where a suitable inductive power receiver (e.g., one associated with a wearable electronic device) may be positioned and receive adequate power. The two flat surfaces 902 and 904 may allow two receiver coils (e.g., for two different watches) to be positioned closer to the ferrite, which may improve coupling. If ferrite block 908 is surrounded by metal or some other magnetic shielding material except for truncated surfaces 902 and 904, and these are positioned on opposite sides of the low reluctance element the horizontal parts of the IPT field on each side of the low reluctance element will effectively cancel (being equal and opposite), which in turn means the direction of the mean IPT field coming out of the low reluctance element across both surfaces will still be vertical. Therefore, when considering the mean direction coming out of the low reluctance element, it may be necessary to consider only the part of the IPT field that passes through a particular charging zone or is received by an inductive power receiver. Further embodiments may include more than two truncated surfaces to provide further charging zones.

FIG. 9B shows another possible embodiment of an IPT director unit 208, including a low reluctance element 600. In this embodiment, the low reluctance element 600 is formed as a truncated cone (as previously described in relation to FIGS. 6A and 6B) mounted on a swivel 914. The swivel enables the low reluctance element 600 to rotate freely inside the IPT director unit, as illustrated by arrow 916. The low reluctance element 600 may include a magnetised part 916 configured to be attracted to the body of an electronic device (not shown) placed onto the IPT director unit. Provided the body of the electronic device includes a suitable ferromagnetic material, when the electronic device is placed onto IPT director unit 208, the low reluctance element will rotate to align with the electronic device irrespective of where it is placed onto the IPT director unit. This means that a user is not required to perfectly align the electronic device onto the IPT director unit, thereby eliminating the need for alignment indicators or facets, and resulting in any number of charging zones.

Figure 10:
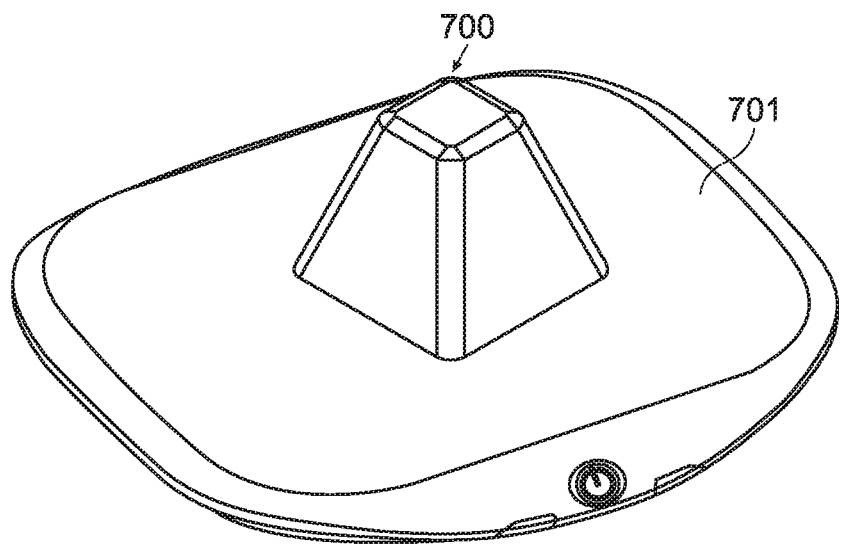
FIG. 10 illustrates another example application of the inductive power transfer system with an IPT director unit in accordance with an embodiment.
Figure 11:
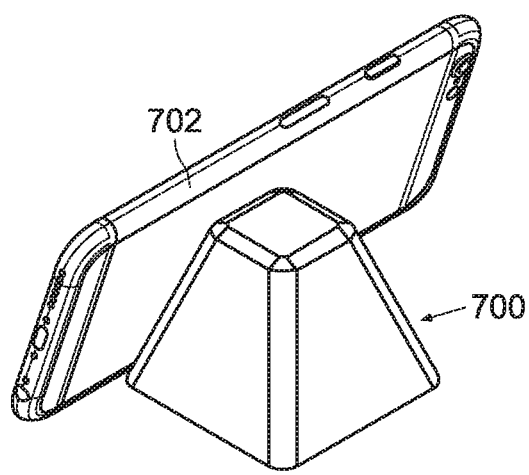
FIGS. 11 and 12 are isolated views of the IPT director unit of FIG. 10 in accordance with an embodiment.
Figure 12:
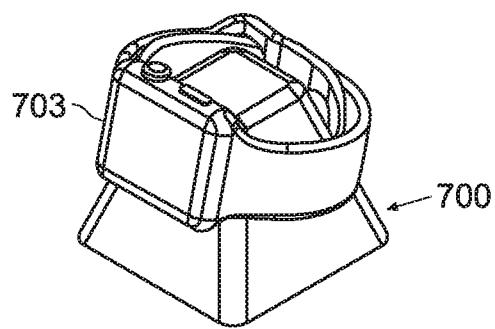

Referring to FIGS. 10 to 12, an IPT director unit 700 having a frustopyrimidal body located on a charging pad 701 is shown. The IPT director unit 700 includes a suitable low reluctance element that provides four charging zones that coincide with each trapezium surface of the IPT director unit. Such charging zones may be achieved by extension of the examples discussed with respect to FIGS. 9A and 9B. As shown in FIG. 11, an electronic device such as a tablet 702 may be positioned in an inclined manner against IPT director unit 700 so that the electronic device is oriented for a user to use the device during charging as well as to position the flat face of tablet 702 with the low reluctance element (not shown) inside IPT director unit 700. As shown in FIG. 12, a smartwatch 703 may be simply placed on IPT director unit 700 and the flat back of the watch will automatically position itself against a flat face of IPT director unit 700 to align the inductive power receiver of smartwatch 703 with the low reluctance element. The tapering shape may also ensure that a watch will be easily placed and retained in the correct position on IPT director unit 700.

Figure 13A:
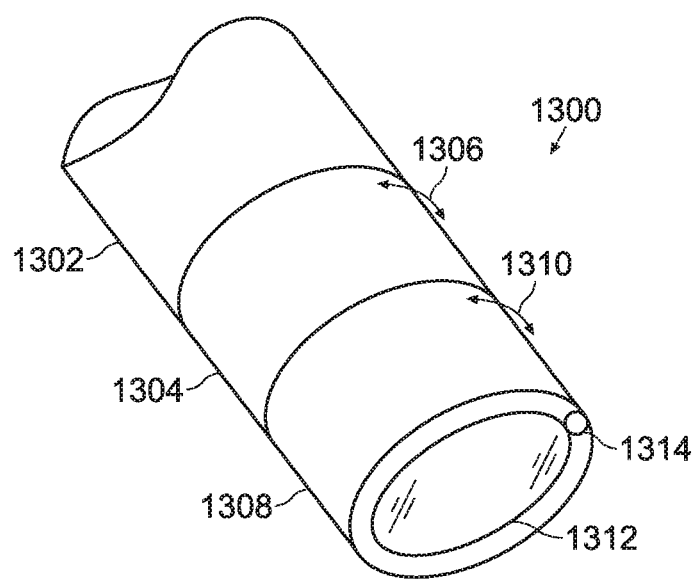
FIG. 13A is an isolated view of a portion of a body tube of a microscope in accordance with an embodiment.

FIG. 13A shows a portion of a body tube 1300 of a microscope. In the embodiment shown, body tube 1300 includes three parts: a fixed part 1302, fixedly connected to the remainder of the microscope (not shown); an intermediary part 1304, coupled to fixed part 1302 but able to freely rotate with respect to fixed part 1302 as indicated by arrow 1306; and a terminal part 1308, coupled to intermediary part 1304 but able to freely rotate with respect to intermediary part 1304 as indicated by arrow 1310.

The terminal part 1308 includes an objective lens 1312 used to capture the subject matter (not shown) being viewed with the microscope. The intermediary part 1304 and terminal part 1308 rotate to allow for a focusing mechanism, for example by varying the length of body tube 1300 and therefore the distance between objective lens 1312 and other optics in the remainder of the microscope. For example, the rotation between intermediary part 1304 and fixed part 1302 my result in a coarse focus and the rotation between terminal part 1308 and intermediary part 1304 may result in a fine focus.

The terminal part 1308 includes a light 1314, which is used to illuminate the subject matter. The light 1314 requires power to operate. One option is to embed a battery into the terminal part 1308, however for small microscopes this may not be possible or desirable. Therefore, it is necessary to provide power from fixed part 1302 (which may in turn get power from an external power source) to terminal part 1308.

Figure 13B:
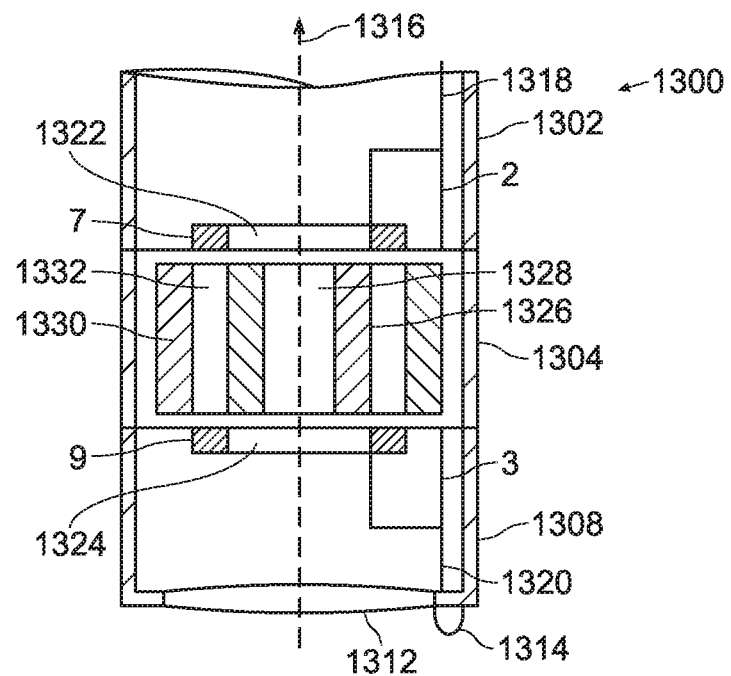
FIG. 13B is a cross-sectional view of the body tube of FIG. 13A in accordance with an embodiment.

FIG. 13B shows a vertical cross-section through the centre of body tube 1300 of FIG. 13A. The body tube 1300 includes fixed part 1302, intermediary part 1304 and terminal part 1308. As indicated by a dashed arrow, an optical path 1316 is provided from objective lens 1312 to the remainder of the microscope (not shown). So that the subject matter of the present invention can be more clearly illustrated, FIG. 13B is a simplified representation of the body tube, and therefore it does not show the mechanics of the focusing mechanism or other elements that may be included in the body tube, e.g., further lenses.

The fixed part 1302 includes an inductive power transmitter 2 (represented by a block) with a wired connection 1318 to a power source (not shown). The inductive power transmitter 2 includes a transmitting coil 7, concentric with the cylinder of body tube 1300. A hole 1322 provided in the centre of transmitting coil 7 ensures optical path 1316 is not obstructed. The hole 1322 may also provide space for further optical elements, such as a lens. As will be appreciated, some parts of inductive power transmitter 2 may be relocated to another part of the microscope due to size constraints or other considerations.

The terminal part 1308 includes an inductive power receiver 3 (represented by a block) with a wired connection 1320 to a light 1312. The inductive power receiver 3 includes a power pickup stage 9 shown as a receiving coil, concentric with the cylinder of body tube 1300. A hole 1324 provided in the centre of the receiving coil ensures optical path 1316 is not obstructed. The hole 1324 may also provide space for further optical elements, such as a lens.

The intermediary part 1304 comprises an IPT director unit 1324 including a low reluctance element 1326. The low reluctance element is formed as a tube concentric with the body of body tube 1300. A hole 1328 provided in the centre of the low reluctance element ensures optical path 1316 is not obstructed. As with the low reluctance element described in relation to FIGS. 2 to 12, the low reluctance element 1326 is made of a material having a high magnetic permeability. In one embodiment, the material will have a relative magnetic permeability greater than 10. In a more specific embodiment, the material will have a relative magnetic permeability greater than 100. For example, the low reluctance element may be made of ferrite.

Upon power being provided to inductive power transmitter 2, an IPT field generated by the transmitting coil passes through low reluctance element 1326 (since it provides a path of least reluctance) and is picked up by the power pickup stage 9 of inductive power receiver 3. The received power is then supplied to light 1312. The low reluctance element 1326 enables the IPT field to extend from transmitting coil 7 to power pickup stage 9 across a distance that would otherwise not permit an inductive coupling. Thus, power is transferred between multiple moving parts without the additional complexity and cost of a traditional repeater.

Further, in this particular embodiment, due to the rotational symmetry of components, regardless of the relative rotation of the three parts 1302, 1304, and 1308, the amount of power transfer is not affected by the movement of the parts. Since intermediary part 1304 is able to rotate with respect to both fixed part 1302 and terminal part 1308, the IPT director unit 1324 is able to rotate with respect to both inductive power transmitter 2 and inductive power receiver 3.

As shown in FIG. 13B the IPT director unit 1324 includes a further low reluctance element 1330. As with low reluctance element 1326, further low reluctance element 1330 is made of a material of a high magnetic permeability. The further low reluctance element 1330 is formed as a tube, concentric with and surrounding low reluctance element 1326. The tubular space 1332 between low reluctance element 1326 and further low reluctance element 1330 has a width so as to limit flux leakage between low reluctance element 1326 and further low reluctance element 1330. In one embodiment, tubular space 1332 may be occupied by a high reluctance material. For example, low reluctance element 1326 may be surrounded by a concentric cylinder made of a non-metallic material, such as plastic or ceramic. The further low reluctance element improves the performance of the IPT director unit by providing a 'return path' for the IPT field, further increasing the maximum distance that the IPT field can extend from transmitting coil 7 and power pickup stage 9. While the low reluctance elements 1326 and 1330 have been shown as concentric cylinders, the particular geometries of the elements (shape, dimensions, relative sizes) will be dictated by the intended application. Magnetic shielding can be positioned between the forward and return ferrite pathways to reduce leakage flux, however this may increase losses.

Figure 14A:
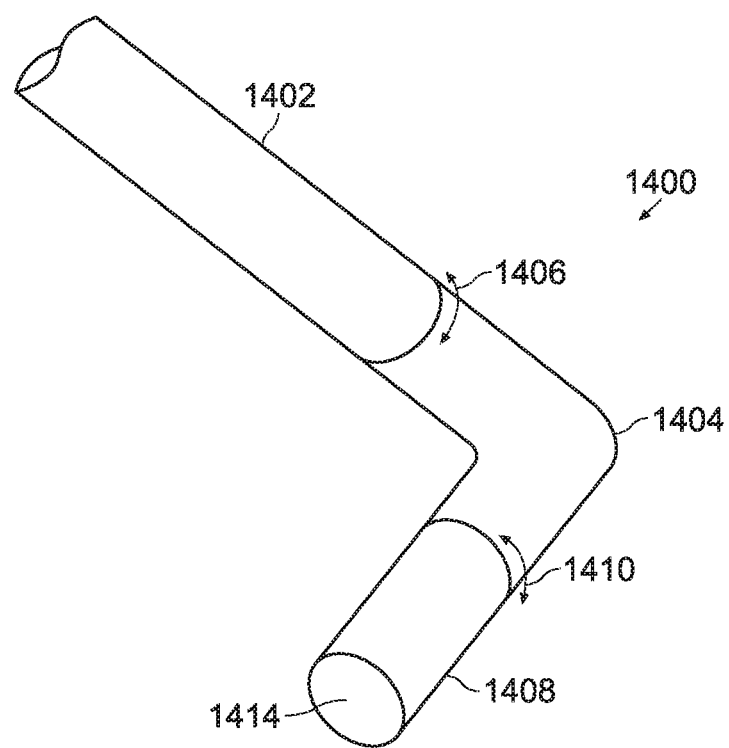
FIG. 14A is an isolated view of a portion of an articulated arm in accordance with an embodiment.

FIG. 14A shows a portion of an articulated arm 1400 from a piece of equipment (e.g., a robotic mechanism). In the embodiment shown, articulated arm 1400 has a generally cylindrical profile and comprises three parts: a fixed part 1402, fixedly connected to the remainder of the piece of equipment (not shown); an intermediary part 1404, coupled to fixed part 1402 but able to freely rotate with respect to fixed part 1402 as indicated by arrow 1406; and a terminal part 1408, coupled to intermediary part 1404 but able to freely rotate with respect to intermediary part 1404 as indicated by arrow 1410. The intermediary part 1404 is configured with a bend such that fixed part 1402 and terminal part 1408 are neither parallel nor co-linear.

The combination of the rotation of intermediary part 1304 and terminal part 1308 and the bend in the intermediary part gives an increased degree of freedom for the movement of terminal part 1308 with respect to the fixed part 1402. Such increased degree of freedom may be necessary for the intended application of the articulated arm. For example, making parts of a consumer product as part of unit production.

The terminal part 1408 may include a connection 1414 to a positioning tool, which is used for electric motors for unit production to grab and position the next unit for processing car assembly. Alternatively terminal part 1408 may be connected to sensors for monitoring force or a camera. The positioning tool 1414 requires power to operate. One option is to embed a battery into terminal part 1408, however for small articulated arms this may not be possible. Therefore, it is necessary to provide power from fixed part 1402 (which may in turn get power from an external power source) to terminal part 1408.

Figure 14B:
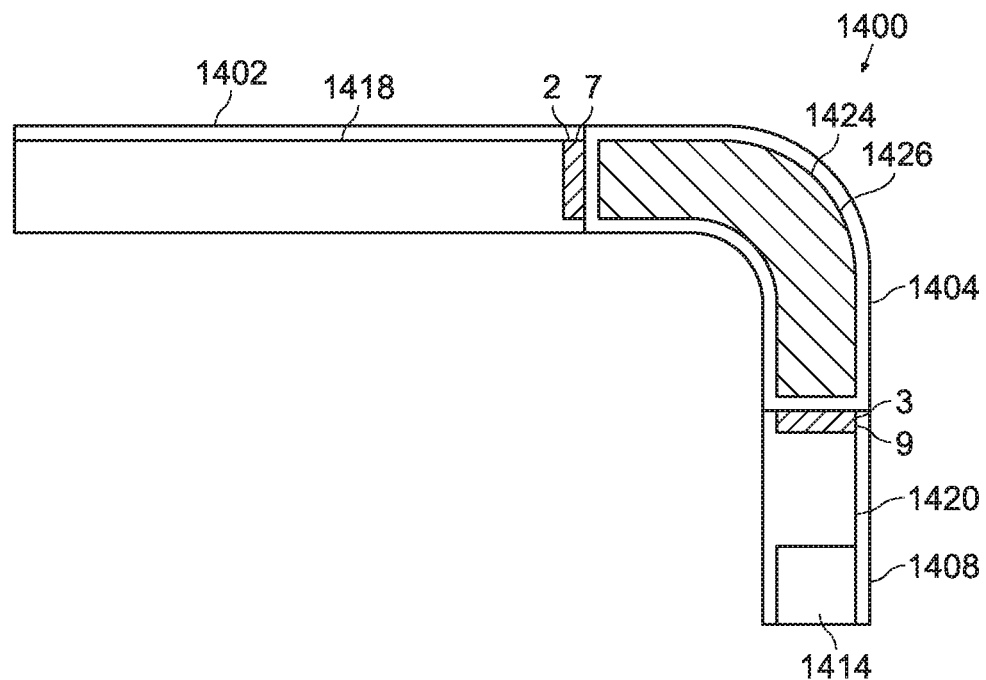
FIG. 14B is a cross-sectional view of the articulated arm of FIG. 14A in accordance with an embodiment.

FIG. 14B shows a cross-section through articulated arm 1400 of FIG. 14A. The articulated arm 1400 includes fixed part 1402, intermediary part 1404 and terminal part 1408. So that the subject matter of the present invention can be more clearly illustrated, FIG. 14B is a simplified representation of articulated arm 1400, and therefore it does not show the internal mechanics of the articulated arm.

The fixed part 1402 includes an inductive power transmitter 2 with a wired connection 1418 to a power source (not shown). The inductive power transmitter 2 includes a transmitting coil 7. As will be appreciated, some parts of inductive power transmitter 2 may be relocated to another part due to size constraints or other considerations.

The terminal part 1408 includes an inductive power receiver 3 with a wired connection 1420 to positioning tool 1414. The inductive power receiver 3 includes a power pickup stage 9 shown as a receiving coil. Due to the relative positions and relative movements of fixed part 1402 and terminal part 1408, power pickup stage 9 will not always be aligned in the same way with transmitting coil 7. Therefore, it is necessary to direct the IPT field from transmitting coil 7 to power pickup stage 9 irrespective of the relative positions of the parts of the articulated arm.

The intermediary part 1404 comprises an IPT director unit 1424 including a low reluctance element 1426. The low reluctance element is formed as a curved cylinder that follows the bend of intermediary part 1404. As with the low reluctance element described in relation to FIGS. 13A and 13B, low reluctance element 1426 is made of a material having a high magnetic permeability. In one embodiment, the material will have a relative magnetic permeability greater than 10. In a more specific embodiment, the material will have a relative magnetic permeability greater than 100. For example, the low reluctance element may be made of ferrite.

Upon power being provided to the inductive power transmitter 2, an IPT field generated by the transmitting coil passes through low reluctance element 1426, and since it provides a path of least reluctance the IPT field will tend to skew in the direction of the bend in intermediary part 1404. As a result, power is picked up by power pickup stage 9 of inductive power receiver 3. The received power is then supplied to positioning tool 1414. As with the embodiment discussed in relation to FIGS. 13A and 13B, low reluctance element 1426 enables the IPT field to extend from transmitting coil 7 to power pickup stage 9 across a distance that would otherwise not permit an inductive coupling. Furthermore, low reluctance element 1426 enables the IPT field to extend from transmitting coil 7 to power pickup stage 9 despite the lack of satisfactory (or consistent) alignment between the coils. Thus, power is transferred between multiple moving parts without the additional complexity and cost of a traditional repeater. Further, in this particular embodiment, due to the rotational symmetry of components, regardless of the relative rotation of the three parts 1402, 1404, and 1408, power transfer is essentially constant. Since intermediary part 1404 is able to rotate with respect to both fixed part 1402 and terminal part 1408, IPT director unit 1424 is able to rotate with respect to both inductive power transmitter 2 and inductive power receiver 3.

Whilst the foregoing has been illustrated by the description of the embodiments thereof, the foregoing is merely illustrative and various modifications can be made to the described embodiments. The foregoing embodiments may be implemented individually or in any combination.

The invention claimed is:

1. An inductive power transfer system comprising:
   an inductive power transmitter having at least one power transmitting coil configured to generate an inductive power transfer (IPT) field; and
   an IPT director unit adjacent to the inductive power transmitter, wherein the IPT director unit comprises a magnetic core configured to direct the IPT field from the inductive power transmitter to an inductive power receiver having at least one power receiving coil and wherein, while the IPT director unit directs the IPT field, a mean direction of the IPT field entering the magnetic core is different from a mean direction of the IPT field exiting the magnetic core;
   wherein the IPT director unit comprises a housing and the magnetic core is rotatable with respect to the housing.

2. The inductive power transfer system according to claim 1, wherein the IPT director unit is configured for receipt on a surface of the inductive power transmitter.

3. The inductive power transfer system according to claim 2, wherein the IPT director unit is configured to hold the inductive power receiver.

4. The inductive power transfer system according to claim 1, wherein the IPT director unit comprises a further power receiving coil configured to receive power from the IPT field and to provide the power to a load.

5. The inductive power transfer system according to claim 4, wherein the load comprises an electronic indicator associated with the IPT director unit.

6. The inductive power transfer system according to claim 1, wherein the magnetic core comprises a primary entry surface and a primary exit surface wherein, while the IPT director unit directs the IPT field, a mean density of the IPT field at the primary entry surface is different from a mean density of the IPT field at the primary exit surface of the magnetic core.

7. The inductive power transfer system according to claim 6, wherein the primary exit surface is oriented at a non-parallel angle with respect to the primary entry surface and wherein the magnetic core has a shape selected from the group consisting of: a truncated pyramid shape and a truncated cone shape.

8. The inductive power transfer system according to claim 1, wherein the magnetic core comprises ferrite.

9. An inductive power transfer system comprising:
   an inductive power transmitter having at least one power transmitting coil configured to generate an inductive power transfer (IPT) field;
   an inductive power receiver having at least one power receiving coil; and
   an IPT director unit located between the inductive power transmitter and the inductive power receiver, wherein the IPT director unit comprises a housing and a magnetic core rotatable with respect to the housing and configured to direct the IPT field from the inductive power transmitter to the inductive power receiver.

10. The inductive power transfer system according to claim 9, wherein the IPT director unit is rotatable with respect to both the inductive power transmitter and the inductive power receiver.

11. The inductive power transfer system according to claim 9, wherein the magnetic core has a relative magnetic permeability that is greater than or equal to 10.

12. The inductive power transfer system according to claim 11, wherein the magnetic core has a relative magnetic permeability that is greater than or equal to 100.

13. The inductive power transfer system according to claim 9, wherein the magnetic core has a shape selected from the group consisting of: a cylinder shape, a truncated cone shape, and a truncated pyramid shape.

14. The inductive power transfer system according to claim 9 wherein, while the magnetic core directs the IPT field, a mean density of the IPT field entering the magnetic core from the inductive power transmitter is different from a mean density of the IPT field exiting the magnetic core.

15. The inductive power transfer system according to claim 14, wherein the at least one power transmitting coil has a first size and the at least one power receiving coil has a second size that is different from the first size.

16. The inductive power transfer system according to claim 14, wherein the magnetic core has a shape selected from the group consisting of: a truncated cone shape and a truncated pyramid shape.

17. The inductive power transfer system according to claim 9 wherein, while the magnetic core directs the IPT field, a mean direction of the IPT field entering the magnetic core from the inductive power transmitter is different from a mean direction of the IPT field exiting the magnetic core.

18. The inductive power transfer system according to claim 9, wherein the magnetic core comprises ferrite.

* * * * *